UNITED STATES PATENT OFFICE.

WILLIAM M. WELLING, OF NEW YORK, N. Y.

IMPROVED COMPOSITION RESEMBLING IVORY.

Specification forming part of Letters Patent No. 89,532, dated April 27, 1869.

*To all whom it may concern:*

Be it known that I, WILLIAM M. WELLING, of the city and State of New York, have invented and made a certain new and useful Composition Resembling Ivory; and I do hereby declare the following to be a full, clear, and exact description of the same, and of the features that distinguish this composition from others.

In Letters Patent granted to me August 4, 1857, a composition for factitious ivory is set forth, in which ivory or bone dust forms one of the principal ingredients. I find that this material is important, under many circumstances, to lessen the weight of the composition, and render the same more nearly the gravity of natural ivory.

My present invention consists in the discovery that a composition formed principally of impalpable white and shellac will produce a very good imitation of ivory, except that its specific gravity is greater.

In articles where weight is of little consequence my invention is especially available, as the color and appearance of my composition are very near to those of ivory, and it is much more water-proof and durable.

I make use of about one part of shellac (I prefer the bleached) to five parts, by weight, of impalpable white.

The materials, finely ground, are mixed thoroughly together, and then heated and ground between heated rollers, and pressed or molded while in a warm and plastic condition, any desired character of dies being employed for this purpose.

The heat required is about 240° to 280° Fahrenheit for melting this composition while being mixed and worked, and I prefer and use steam under pressure.

The impalpable white is an acetate of lead precipitated by sulphuric acid; but any other preparation of lead that may possess the necessary white color, and that will mix and intimately combine with shellac, may be employed, and any desired pigments may be introduced, to give the required colors to the compound in imitation of colored ivory.

What I claim, and desire to secure by Letters Patent, is—

The composition herein specified, having the appearance of ivory.

In witness whereof I have hereunto set my signature this 19th day of December, 1868.

WM. M. WELLING.

Witnesses:
   CHAS. H. SMITH,
   GEO. T. PINCKNEY.